May 21, 1968 G. J. DOUNDOULAKIS 3,384,710

NARROW BAND TELEVISION

Filed April 22, 1965 2 Sheets-Sheet 1

INVENTOR.
GEORGE J. DOUNDOULAKIS
BY
Constantine A. Michalos
ATTORNEY

INVENTOR.
GEORGE J. DOUNDOULAKIS
BY
Constantine A. Michalos
ATTORNEY 3,384,710
NARROW BAND TELEVISION
George J. Doundoulakis, 2498 Kayron Lane, North Bellmore, N.Y. 11710
Filed Apr. 22, 1965, Ser. No. 449,993
14 Claims. (Cl. 178—6.8)

ABSTRACT OF THE DISCLOSURE

A television system having a television camera for scanning an image to be reproduced including switch means to alternate the scanning in one direction and then for rescanning in the opposite direction at a variable velocity, said velocity being varied as a function of the rate of variation of light intensity of the scanned image. The system is operable by a flip-flop circuit which in turn receives command signals from a vertical trigger generator which in cooperation with a decay network and a storage tube produces a television image utilizing a reduced frequency bandwidth.

This invention relates to electronic systems for scanning, transmitting, and reproducing images and more particularly to electronic systems, such as the systems in television, for transmission of image information using a variable rate of scanning which is derived from the information contained in the image being scanned.

The required bandwidth in television and other scanning systems results from the rate of variation of the intensity along horizontal strips of the scanned configuration. In television systems, the faster the rate of change of the picture intensity, the greater the required bandwidth; thus the required frequency bandwidth is determined by the rate of variation of intensity, and, therefore, the rate of variation of the video signal necessary to change the intensity of the picture from extreme white to extreme black, or vice-versa, within a fixed short length interval along the horizontal line of the picture.

Scanning is also employed in a multitude of other instances, as for example, in computers, in facsimile, and in stencil-cutting for mimeograph machines. For every such device a frequency bandwidth is assigned. The frequency bandwidth, in every case, may be visualized as the speed of response required of the particular device to reproduce the sharpest variations of signal intensity within the time allowed. Devices employing scanning could utilize narrower frequency bandwidths if the rate of scanning were slowed down. This, however, would result in direct deterioration of the performance of the particular system. For example, in the case of television, if the number of frames were reduced, a flicker of the picture would result which would make it uncomfortable to the viewer. Slowing down the scanning rate of a facsimile system would correspond directly to a loss of time and, therefore, would result in proportionate inefficiency of the system.

Reduction of the required frequency bandwidths for applications such as mentioned above will not only improve the efficiency of presently available devices using scanning techniques, but will also enable the feasibility and generation of new devices. Such new devices cannot function today because conventional methods and systems demand frequency bandwidths which cannot presently be accommodated by such devices. For example, slow response devices such as the phonograph type and other mechanical systems, audio tape recorders, narrow frequency bandwith transmission lines such as telephone lines, cannot process television video signals at present.

In my copending application Ser. No. 190,973, filed Apr. 30, 1962, now U.S. Patent 3,204,026, I have shown that a reduction in the frequency bandwidth cain be realized if the rate of scanning of a visual image does not remain uniform, as is the case in the conventional television, but is continuously adjusted so that the rate of scanning is delayed during the scanning of line segments at which a variation of intensity occurs. The rate of scanning along uniform intensity line segments can then be increased to compensate for time loss in the non-uniform intensity line segments.

In addition, I have shown in the copending application Ser. No. 190,973 that reduction in the required frequency bandwidth can only be achieved if advanced information, as to an intensity variation which is to occur after a uniform intensity line segment, is supplied to the receiving equipment, sufficiently in advance to permit the receiving equipment to adjust its speed of scanning to the delayed rate of scanning required during an intensity variation. If such advanced information is not available to the receiving equipment, an increase rather than a decrease in the required bandwidth will result.

The method by which the variable scanning system was solved in my previous application Ser. No. 190,973, incorporated means for delaying the signal supplying the scanning rate information. Thus, from the same signal, two signals were generated, one in real time, the other in delayed time. The signal in real time was then employed to supply the advanced information, which, as explained above, is necessary. This complication was solved at the expense of circuit complexity through feedback electronic controls which supply compensations and adjustments. In addition, it was found in practice that these feedback controls had to be individually adjusted at different times for proper performance.

The present improvement provides a new approach for the supply of the advanced information. The picture is first scanned and the scanning rate information is stored in a storage tube driven by common deflection voltages in both the vertical and horizontal sense as the television camera. The stored information pertains to the amount of slowing down in the horizontal scanning velocity from a predetermined high scanning velocity. In addition, while the retardation signal is allowed to increase quickly, its decay is extended in time. By scanning the image horizontally in both directions, left to right and right to left, the accumulated velocity retarding signal in the storage tube is stretched in both directions. Thus, regardless of the direction of horizontal scanning, advanced information is supplied to the image reproducing portion of the invention, about any intensity variation to follow.

In the portion of signal generating means of the invention, a television camera and a storage tube are scanned by some horizontal and vertical sweep voltages. The direction of horizontal scanning is reversed at the end of each image field. The horizontal sweep signal is derived from a voltage sweep generator. The flow of charge into a condenser in the sweep generator is restricted in accordance to the rate of change of the image intensity scanned by the television camera. In addition, the restriction on the flow of charge is extended in time by an amount depending on the frequency bandwidth of the transmission system. The amount of restriction of the electron flow into the above condenser is recorded and read from the storage tube. Since the image is scanned in both directions, the storage tube has stored therein an image of the amount of velocity retardation extended in both directions. During each scan, means are provided for the tube to read and adjust its signal to new information.

In a preferred method, the transmission system transmits these discrete signals, the image intensity signal, the horizontal sweep signal and the vertical sweep signal.

Transmission of these signals may be accomplished by three separate conductors or each signal may be multiplexed and modulated on the same or separate frequency carriers, FM, AM, or in any other type of modulation.

After receiving the signals, the image reproducing portion of the invention supplies fixed voltages to which the received signals are compared and adjusted. They may then be fed directly to the television system or monitored for reproduction of the image. The image reproducing portion of the invention becomes, therefore, greatly simplified, compared to conventional television sets. It should be noted though that a separate channel will have to be provided for the transmission of sound associated with each image. As to the image reproducing portion of the invention, a simple storage tube supplies for storing the previous image. No storing of the scanning rate is necessary because such information arrives from the image generating portion.

It is therefore among the objects of this invention to provide an improved electronic system for variable scanning of visual images, capable of deriving the advanced information needed to regulate the rate of scanning of an image for the purpose of obtaining output signals which can be transmitted to a receiving station by a narrower frequency bandwidth transmission line than would otherwise be required for accurate reproduction of the image.

Another object of the present invention is to provide for a stable variable scanning, narrow frequency bandwidth picture transmission and reproduction system capable of reproducing accurate images without the need of numerous adjustments.

Another object of this invention is to provide a variable speed scanning system capable of processing information pertaining to visual images at a high rate of information per unit of utilized frequency bandwidth.

Still another object of the invention is to provide a simplified and efficient method and means for reading, processing, transmitting, recording, receiving and reproducing image information or other type information which is first transformed into an image.

An additional object of the present invention is to provide coded visual information contained on a visual display in a narrow bandwidth signal, so that this signal may be recorded on low frequency tape, and on long-playing records now employing stereophonic sound, and, in addition, it may be utilized in television-telephones requiring only a limited number of lines to be transmitted by telephone circuits and narrow bandwidth wireless channels.

It is a further object of this invention to provide a method for increasing efficiency by reducing the bandwidth now required by conventional devices employed in scanning, transmitting, recording and reproducing visual information, or any other data which may be presented in two dimensional matrix form, so that better performance is achieved with the presently employed bandwidth.

It is also an object of the invention to code television programs and other visual information in such a manner that conventional receiving devices are unable to translate and process the information, but receiving and processing apparatus in accordance with the invention will be able to reproduce the visual information for "Pay Television" applications, educational or military purposes, and other programs and transmissions intended for restricted groups of individuals.

Objects and advantages other than those above set forth will be apparent to those skilled in the art from the following description in terms of the embodiments thereof when read in connection with the accompanying drawings in which.

Figures 1, 2:
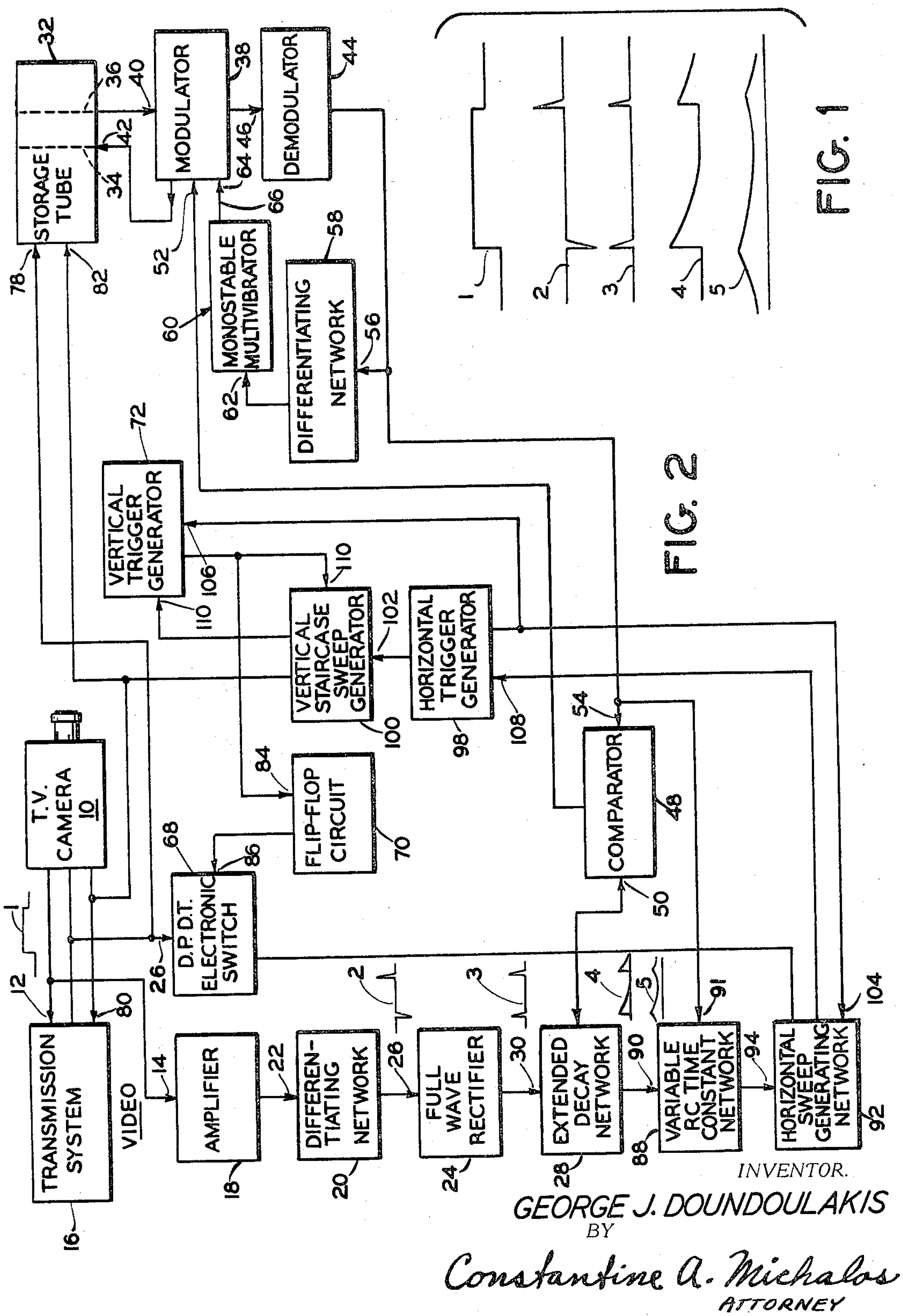
FIGURE 1 is a graph showing the steps in which sharp image intensity variations are transformed into symmetrical scan velocity retarding signals.
FIGURE 2 is a functional block diagram of the image signals generating portion in accordance with the embodiment of the invention.

Referring now to the graphical representation of the signals of FIGURE 1, in which sharp image intensity variations are transformed into symmetrical scan velocity retarding signals, a graph line 1 represents the space distribution of intensity of a horizontal line of a scanned image. When this line is scanned, a signal of similar shape is provided by the television camera. The signal shape as shown in graph line 1, when differentiated, is transformed into a second signal whose shape resembles that of a graph line 2.

The second signal is then passed through a full wave rectifier which inverts the negative-going portions of the signal yielding a third signal, shown as graph line 3, which may be called the unipolar derivative of the first signal.

An extended decay network comprised mainly of a capacitor in series with a parallel combination of a diode and a resistor, as hereinafter described, allows the third signal to rise fast during charging but decay slower during discharging because the "RC time constant" in the forward direction depends on the low resistance of the diode; whereas in the discharging mode, the RC time constant depends on the resistance in shunt resistance across the diode. Thus the third signal shown as graph line 3 is transformed into a fourth signal, as shown by graph line 4, which is stretched from left to right.

Signal 4 is stored in a storage tube. Then, when the same line is scanned in the reverse direction, a similar network prevents fast decay and therefore the decaying signal is also stretched from right to left.

A fifth signal, therefore, shown as graph line 5 constitutes a symmetrical stretching of the decay of the image signal derivative in both the right-going direction and the left-going direction. Thus regardless of the direction in which a line is scanned advanced information is provided to the image reproducing means about a variation to follow. The signal shown as graph line 5 is the signal which determines, as provided in the invention hereinafter, the extent at which the velocity of the scanning beam is slowed down at every instant.

As illustrated in the functional block diagram of the image signal generating portion of FIGURE 2 of the drawing the embodiment of this invention provides for a television camera 10 for receiving horizontal and vertical beam deflection voltages which are a function of the intensity of the image being scanned. The television camera 10, in turn, provides a signal which is proportional to the intensity of the image portion being scanned.

Connecting the television camera 10, as shown by arrows 12 and 14, is a transmission system 16 and an amplifier 18 respectively. Connecting the amplifier 18 is a differentiating network 20, as shown by arrow 22. The image signal is first amplified by amplifier 18, then it is differentiated by the differentiating network 14 and the resulting derivative is rectified in a full wave sense by the full wave rectifier 24 which is connected to the differentiating network 20 as shown by arrow 26. The output of the full wave rectifier 24 is a measure of the rate of change of the image intensity signal as it may be read by an electronic beam. The full wave rectifier 24 serves to provide a positive signal regardless of whether the signal changes from high to a lower value of from a low value to a higher value.

The resulting unipolar derivation signal is employed to slow down the rate of scanning so that a lower bandwidth will result for the transmission of the video signal, during variations of the video signal intensity. The unipolar derivative signal, therefore, is to provide the same amount of beam retardation for a positive or negative change of the image intensity signal.

Connecting the full wave rectifier 24 is an extended decay network 28, as shown by arrow 30. The extended decay network 28 serves to stretch the unipolar derivative pulses in the direction of the horizontal scanning, to a degree compatible with the available bandwidth of the transmission system. The transmission system delivers a signal from the signal generating portion to the signal reproducing portion of the invention.

The unipolar derivative from the extended decay network 28 is next stored in storage tube 32 which is connected to the network 28 by a circuitry as hereinafter more fully described. The storage tube 32 is a simple beam storage tube comprised mainly of an electron gun, which produces and focuses electrons toward two screens, a control screen 34, and a collector screen 36. The control screen 34 is covered by a sensitive dielectric insulator. When the control screen potential with respect to the cathode is high (about 300 volts) the secondary emission ratio becomes greater than unity and the dielectric screen loses more electrons than it receives from the scanning beam, whereby it is charged positive.

At a low screen potential (about 30 volts) the secondary emission ratio is less than unity and the dielectric is charged negative. In this manner, a signal can be rendered on the sensitive dielectric surface. As the electronic beam is scanned with the control screen at a low potential with respect to the cathode, the amount of electrons which are allowed to reach a collector screen is a function of the electronic charge on the dielectric surface. In a single beam storage tube, writing, erasing, and reading is accomplished by the same electronic beam. The mode of operation is determined by the potential of the control screen with respect to the cathode.

In the embodiment described herein, readnig and writing of the signal in the storage tube 32 occurs intermittently. A single beam storage tube is employed in the embodiment to avoid the possible desynchronization between reading and writing beams and the higher cost of dual beam storage tubes. Intermittent reading and writing of the single beam storage tube 32 is accomplished by modulating the control screen potential between three distinct levels, an erasing level, a writing level and a reading level. This is accomplished by a modulator 38, which is connected to the storage tube 32, as shown by arrows 40 and 42. It should be noted that the modulator 38 provides for a high frequency trapezoidal generator, alternating between reading and writing potential.

A demodulator 44 connecting the modulator 38 as shown by arrow 46, derives the signal read from the storage tube 32 by the scanning beam. This signal is compared to the stretched bipolar derivative signal from the extended decay network 28 by a comparator 48 which is connected to the extended decay network 28, as shown by arrow 50, and is connected to the modulator 38 as shown by arrow 52 and to the demodulator 44, as shown by arrow 54.

If the signal read from the storage tube 32 is greater than the incoming derivative signal from the extended decay network 28, the voltage from the trapezoidal wave generator of the modulator 38 is diminished to an erasing potential by the modulator 38. If the signal read by the storage tube 32 is smaller than the incoming signal from the network 28, the full generator voltage is applied to the control screen 34 thus increasing the relative positive charge. In this manner, an electronic charge image on the sensitive dielectric surface is read half the time while in the remaining time it is continuously adjusted to equal the value of the unipolar stretched derivative provided by the extended decay network 18.

Connecting the demodulator 44, as shown by an arrow 56, is a differentiating network 58. In addition, as shown in the FIGURE 2, the differentiating network 56 is connected to the comparator 48. Interposed between the differentiating network 58 and the modulator 38 is a monostable multivibrator 60 which is connected to the differentiating network 58, as shown by arrow 62, and to the modulator as shown by arrow 64.

Figure 3:
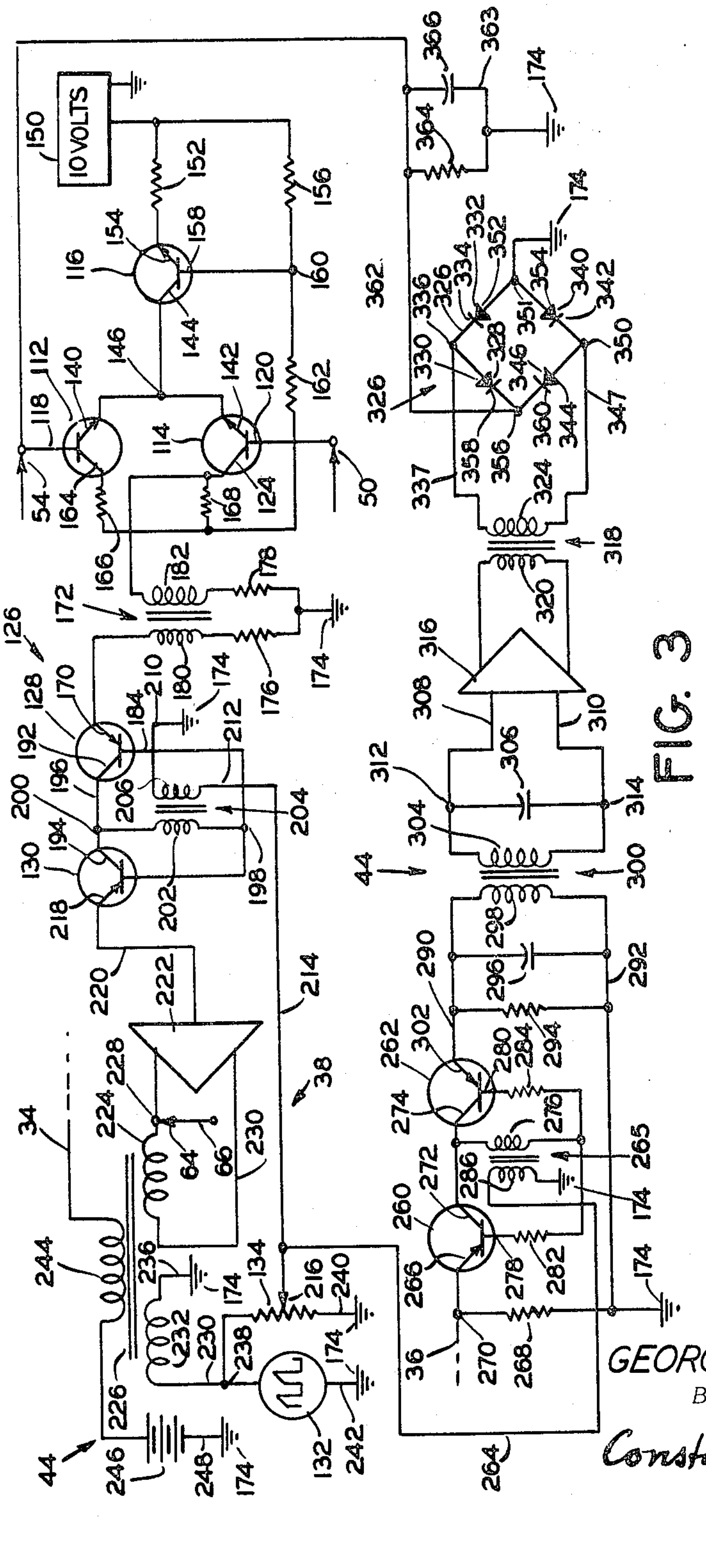
FIGURE 3 is a semidetailed electronic diagram of the storage portion shown in FIGURE 2.

The differentiating network 58 detects the positive derivative of the signal read from the storage tube 32 and provides a pulse to input 66 of the modulator, as shown in FIGURE 3, and as hereinafter more fully described, which adjusts the control screen potential of the storage tube 32 to the reading level. The purpose of this feature is to preserve the stretching of the unipolar derivative in the direction opposite to the direction of scanning. Information therefore is erased from the storage tube 32 only if the signal read from the storage tube 32 is characteristic by a negative rate of change.

The horizontal direction of scanning in the television camera 10 alternates from left to right and then from right to left every other field. This is accomplished in the embodiment by simply switching the polarity of the horizontal sweep signal into the television camera 10, by an electronic double pole double throw switch 68 as herewith more fully described. The state of switch 68 controlled by the signal received from a flip-flop circuit 70, in turn receives command pulses from a vertical trigger generator 72.

The television camera 10 is connected to the transmission system 16, as shown by an arrow 12, with the switch 68, as shown by arrow 26, and to the storage tube 32, as shown by arrow 78.

Further, as shown by arrows 80 and 82, the television camera 10 is connected to the transmission system 16 with the storage tube 32 respectively. In addition the flip-flop circuit 70 is interposed between the vertical trigger generator 72 as shown by arrow 84 and the switch 68 as shown by arrow 86.

Therefore by switching the direction of horizontal scanning, every other field, the unipolar derivative is stretched in both directions. Thus, when the electronic beam is scanned from right to left, the stretching of the unipolar derivative from left to right provides advanced information as to an intensity variation to come. The electronic processing of the unipolar derivatives for the generation of horizontal and vertical sweep voltages remain the same as shown in the previously mentioned application Ser. No. 190,973.

The unipolar derivative which is now obtained from the output of the demodulator 44 is fed as a negative signal into a variable resistor-capacitor time constant network 88, as shown by arrow 90 which slows down the rate at which a capacitor in a horizontal sweep generating network 92 is charged. The horizontal sweep generator network 92 is connected to the variable resistor-capacitor network 88, as shown by arrow 94 and is connected to the electronic switch 68 as shown by line 96. The potential across the capacitor is fed as a horizontal deflection signal to both the television camera 10 and the storage tube 32. When the potential across this capacitor reaches a critical value, a horizontal trigger generator 98 discharges the capacitor and also sends a pulse to a vertical staircase sweep generator 100 to change the vertical sweep voltage by a predetermined amount.

As shown in FIGURE 2, the horizontal trigger generator 98 is connected to the vertical staircase generator 100 as shown by arrow 102, and is connected to the horizontal sweep generator network 92 with the vertical trigger generator 72 as shown by arrows 104 and 106 respectively. In addition the horizontal sweep generator network 92 is connected directly to the horizontal trigger generator 98 as shown by arrow 108. Further, as shown by arrow 110, the vertical staircase sweep generator 100 is connected to the vertical trigger generator 72 with the flip-flop circuit 70, as shown by the arrow 84.

When an analogous capacitor (not shown) in the generator 100 reaches a critical predetermined potential, the vertical trigger generator 72 discharges the vertical sweep voltage capacitor at the arrival of a pulse from the horizontal trigger generator 98. The discharging pulse from the vertical trigger generator 72 is also fed to the flip-flop circuit 70 so that the direction of horizontal scanning is also reversed.

A detailed circuitry of the modulator 38 together with demodulator 44 and comparator 48 of FIGURE 2, is shown in FIGURE 3. Therefore referring to FIGURE 3 of the drawing, there is provided in the comparator 48, NPN transistors 112, 114 and 116 with the associated resistors, to form a differential amplifier.

As hereinbefore described the signal from the demodulator 44, shown in FIGURE 2, is fed into the input of the comparator 48, as shown by arrow 54, to a base terminal 118 of the transistor 112, as shown in FIGURE 3 while the signal from the extended decay network 28, shown in FIGURE 2 is fed into the input of the comparator 48, as shown by the arrow 50 to a base terminal 120 of the transistor 114, as shown in FIGURE 3. The output of the comparator is directed from the collector terminal 124 of the transistor 114 to provide the negative difference of the two input signals of the base terminals 118 and 120 of the transistors 112 and 114 respectively. The differential signal from the collector terminal 124 is transformer coupled to a single pole single throw gate 126 formed by two chopper PNP transistors 128 and 130, as hereinafter described. The transistors 128 and 130 are pulsed to allow signals to pass only part of the time. This is accomplished by a signal from a trapezoidal wave generator 132, reduced through a voltage divider 134.

As illustrated in detail in FIGURE 3, emitter terminals 140 and 142 of transistors 118 and 120, respectively, are connected to a collector terminal 144 of the transistor 116 at a junction 146. Connecting a ten volt potential 150, through a resistor 152 is an emitter terminal 154 of the transistor 116.

In addition, connecting the direct current potential 150 through a risistor 156 is a base terminal 158 of the transistor 116. Further, connecting the potential 150 through the resistor 156 at a junction 160 is a line resistor 162 which in turn connects a collector terminal 164 of the transistor 112 through a resistor 166 and the collector terminal 124 of the transistor 114 through a resistor 168.

As herein provided, the signal derived from the collector terminal 124 of the transistor 116, is directed to an emitter terminal 170 of the transistor 128 through a transformer 172. The transformer 172 is connected to ground 174 through a pair of resistors 176 and 178 which in turn are connected to coils 180 and 182 respectively.

Connecting base terminals 184 and 186 of transistors 128 and 130 respectivcely is a line conductor 190. Connecting collector terminals 192 and 194 of the transistors 128 and 130 respectively is another line conductor 196. Interposed between the line conductors 190 and 196 at junctions 198 and 200, respectively, is a coil 202 of a transformer 204. Another coil 206 of the transformer 204, which is connected to ground 174 with one of its leads 210, is connected by its other lead 212 to a line conductor 214. The line conductor is connected to a movable terminal 216 which is in slidable contact with the voltage divider 134.

The transistor 130 also comprises an emitter terminal 218 which is connected by a line conductor 220 to a differential amplifier 222. The amplifier 222 is connected to a transformer primary coil 224 of a transformer 226 and to the output of the differentiating network 58, shown in FIGURE 2, which connects the input 66 of the modulator 38, as shown in FIGURE 3 at a junction 228. A line conductor 230 completes the circuit of the amplifier 222 with the transformer coil 224.

Connecting the trapezoidal wave generator 132 by a line conductor 230 is a second primary coil 232 of the transformer 226. The coil 232 is connected to ground 174 by a line conductor 234. In addition, the line conductor 230 connects the coil 232 to the voltage divider 134 at junction 238. Further, the voltage divider 134 is connected to ground 174 by a line conductor 240, and the generator 132 is connected to ground 174 by a line conductor 242.

The generator 132 is a high frequency generator which supplies several oscillations during the time it takes for an electron beam to scan a single cell. The lowest value of the voltage from generator 132 corresponds to reading potential, while the high voltage level corresponds to writing potential.

The signal from the differential amplifier 222 is allowed to go through the single pole single throw gate 126 only during writing potential. It is then amplified by the amplifier 222 and fed into one of the primary coils 224 of the transformer 226, while the other primary coil 232 is fed by the generator 132.

The relative polarities of the two primary coils 224 and 232 of the transformer 226 is such that a positive signal at the collector 164 of the transistor 112 induces flux in the transformer 226 in opposition to the flux induced by the pulses from the generator 132.

The signal from the collector screen 36 of the storage tube 32 is interrupted during "writing" or "reading" portion of the square wave pulses from the generator 132 by a pair of chopping transistors 260 and 162. This pair of chopping transistors 260 and 262 are synchronized by a voltage received from the square wave generator 132 through a line conductor 264 reduced by the voltage divider 134, and transformer coupled to transistors 260 and 262 through a transformer 265.

The collector screen 36 is connected to a collector terminal 266 of the transistor 260 and to ground 174 through a resistor 268 at junction 270. An emitter terminal 272 of the transistor 260 is connected to an emitter terminal 274 of the transistor 262, with a coil 276 of the transformer 265 interconnecting base terminals 278 and 280 of the transistors 260 and 262 through resistors 282 and 284 respectively. A second coil 286 of the transformer 265 is connected to ground 174.

Connected in parallel between two line conductors 290 and 292 is a resistor 294, a capacitor 296 and a coil 298 of a transformer 300. The line conductor 290 is connected to a collector terminal 302 of the transistor 262 and the line conductor 292 is connected to ground 174.

A second coil 304 of the transformer 300 is connected in parallel with the second condenser 306. A pair of line conductors 308 and 310, which connect the coil 304 and the condenser 306 at junctions 312 and 314, are connected to a low frequency amplifier 316.

The amplifier 316 is connected through a transformer 318 having a pair of coils 320 and 324 to a bridge circuit 326. The bridge 326 is provided with a diode 328 having an anode 330 and a second diode 332 having a cathode 334 connecting the coil 324 at a junction 336 with a line conductor 337. In additon, the bridge circuit 326 comprises a third diode 340 havng a cathode 342 and a fourth diode 344 having an anode 346 connecting the coil 324 at junction 350 with a second line conductor 347.

Connecting the diode 332 at junction 351 by its anode 354 is ground 174. In addition, connecting at junction 356 the diode 328 by its cathode 358 and the diode 344 by its cathode 360 is a line conductor 362 which connects in parallel a filter 363 including a resistor 364 and a capacitor 366 producing a filtering action for the system. The filter 363 is connected to ground 174.

In addition, the line conductor 362 reverts back to connect to the demodulator 44 of the comparator 48 as shown by arrow 54, as shown in FIGURES 2 and 3.

Therefore, as hereinbefore described, the signal from the collector screen 36 is allowed to go through while the potential from the trapezoidal wave generator 132 permits reading of the storage tube 32 but the pair of transistors 260 and 262 stop conduction while the beam is either "writing" or "erasing."

The signal then from the storage tube 32 is modulated at the frequency provided by the trapezoidal wave generator 132. The carrier frequency is eliminated during the relatively low frequency amplication by the amplifier 316. The desired signal then is detected in a full wave sense by the bridge 326 filtered by the filter 368 and fed into the input 54 of the comparator 48.

Figure 4:
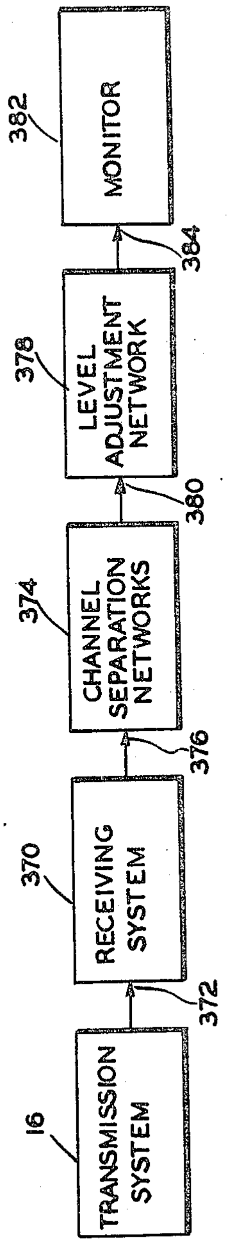
FIGURE 4 is a functional block diagram of the image reproducing portion in accordance with the embodiment of the invention.

The resulting image signal, the horizontal deflection voltage, and the vertical deflection voltage are all transmitted as they are to the image reproducing portion as shown in the block diagram of FIGURE 4. The transmission system 16 in FIGURES 2 and 4 may comprise any means of transmittal of electronic voltages, in real or delayed time. For example, the transmission system 16 may be a radio station providing its own type of carrier and signal multiplexing networks or it may be a recording device again providing its own facilities for storing and reproducing voltage signals. From the transmission system 16 the signals are received by a receiving means 370, as shown by an arrow 372 compatible to the method of transmission. Also, channel separation networks 374, connecting the receiving means as shown by arrow 376, are employed to separate the image intensity signal from the horizontal and vertical beam deflection signals. The channel separation network 374, which may be a multichannel tape recording block, is again compatible with the method of transmission. For example, if all these signals are multiplexed on the same carrier frequency, appropriate filter networks are employed to separate the three channels.

In the case of direct transmission, the multichannel tape recording block 374 will amount to simple corrections. A level adjustment network 278 following the channel separation networks, as shown by arrow 380, provides automatic gain control to each channel.

The amount of signal amplication is derived by detection and adjustment of the peak value of the horizontal beam deflection signal to a predeterminal level. With the levels of the image intensity signal, and the horizontal and vertical beam deflection signals adjusted, a monitor 382 connecting the level adjusting network 378, as shown by arrow 384, comprised mainly of a monitor tube and appropriate power supply to receive and reproduce the transmitted image.

In the operation of the system, a reduction in the required frequency bandwidth can be achieved if the rate of scanning, of a visual image, varies. As brought out hereinbefore, the rate of scannings is delayed during the scanning of line segments at which a variation of intensity occurs.

The rate of scanning along uniform intensity line segments can be increased for time loss in the non-uniform intensity segments. This would not only compensate for the time loss in the non-uniform intensity segments section but would produce an overall increase in the scanning.

Reduction in the required frequency can only be achieved if advanced information, as to an intensity variation which is to occur after a uniform intensity line segment section, is supplied to the receiving equipment sufficiently in advance to permit the receiving equipment to adjust its speed of scanning to the delayed rate of scanning required during an intensity variation. If such advanced information is not available to the receiving equipment, an increase rather than a decrease in the required bandwidth will result.

In the operation of the narrow band television system this statement may be easily visualized by referring to an analogous situation of an automobile traveling on a road. It is well known that an automobile is designed to withstand certain maximum g's (or gravity) of shock. If a sudden depression on the road is to impart a shock greater than the maximum magnitude of shock which the automobile can withstand, the automobile will probably be damaged. If depressions are to occur on the road, the automobile will either have to proceed at a low rate of velocity or a road sign will have to be installed to warn the driver of the road depression at a distance sufficiently ahead so that the driver can start applying his brakes sufficiently in advance to lower the speed of this automobile by the time it reaches the road depression. The maximum rate of speed the automobile should move will depend on the distance at which the warning signal is placed ahead of the depression and the speed with which the driver can apply his brakes.

In this example, the magnitude of shock the automobile can withstand will be analogous to the frequency bandwidth needed for the transmission of a visual image and the road depression will be analogous to a variation in intensity. In addition, the conventional television system will be analogous to an automobile which has to travel at a low uniform speed, with the shock indurance the automobile can withstand being about equal to the sharpest depression which can be encountered on the road.

It should be noted that in the conventional television, as in an automobile traveling over an unmarked road, no advantage is taken as to the intensity variation of scanning of the television or the number of depressions which may be encountered during the length of the trip.

In the variable scanning system, the smaller the number of intensity variations or the smaller the number of depressions on the road, the sooner the scanning or the automobile trip will be completed.

It should further be noted that if no warning signs were used to warn the driver of the automobile, the driver having only perception of a short distance ahead will start applying the brake too late to avoid damaging the car. The slowing down of the automobile will substantially occur after the depression has already been passed, at a segment of the road at which the automobile does not have to travel at a slow rate of speed. For this reason, the automobile will have to travel at a low rate of speed to avoid damage. In this respect, the slowing down after the road depression will only result in inefficiency.

Therefore, the present invention provides for a new approach to supply advanced information necessary to control the rate of scanning. In terms of the automobile analogy, advanced information will be supplied if the road is covered first by an automobile which will travel in the opposite direction than the first automobile. The second automobile will place marks after each road depression, showing the extent to which the driver of the first automobile should reduce his speed. In this manner, the relative speed and position between the two automobiles becomes an irrelevant matter, since the second or marking car has established the markings on the road for the first car.

Referring particularly to FIGURE 4 of the drawing, generally; the transmission system 16, which may be a radio station or a recording device, directs signals into the receiving system 370 which in turn directs the signals into a channel separating network 374. The channel separating network 374 separates the image intensity signals from the horizontal and vertical beam deflection signals. The signals are then directed into the level adjustment network 378 which provides an automatic gain control to each channel. Following, the signals are then directed into the monitor 382 which receives the signal which was originally directed from the transmission system 16 and reproduces it into a visual image.

In detail, referring to all the figures of the drawing, the operation of the system provides for the television camera 10 to scan a predetermined image. The camera 10 detects a horizontal line of the scanned image having a space distribution of intensity in the shape similar to the graph line 1. The television camera 10 in turn provides a signal which is proportional to the intensity of the image line being scanned.

The horizontal direction of scanning in the camera 10 alternates from left to right and then from right to left every other field. This is accomplished simply by switching the polarity of the horizontal sweep signal by the electronic double pole double throw switch 68. The control of this switch 68 is provided by a signal received from the flip-flop circuit 70, which in turn receives command signals from the vertical trigger generator 72.

As shown, the image signal from the television camera is directed into the transmission system 16 and to the amplifier 18 for the amplification of the signal. The signal is first amplified by the amplifier 18, then it is differentiated by the differentiating network 20 producing a signal in the shape shown in the graph line 2 and the resulting derivative is rectified in a full wave sense by the full wave rectifier 24 to produce a signal in the shape shown by graph line 3.

As shown, the full wave rectifier 24 rectifies the signal to invert the negative going portion into a signal shown by graph line 3 which signal can be called the unipolar derivative of the first signal. The output of the full wave rectifier 24 is a measure of the rate of change of the image intensity signal as it is read by an electronic beam. The full wave rectifier serves to provide a positive signal regardless of whether the signal changes from a high to lower value or a low to a higher value. This resulting unipolar derivative signal is utilized to slow down the rate of scanning to thereby produce the lower bandwidth for the transmission of the video signal during the variation of the video signal intensity. The unipolar derivative signal, therefore, provides the same amount of beam retardation for a positive or for a negative change of the image intensity signal.

The signal is then directed through the extended decay network 28 which comprises mainly a capacitor in series with a parallel combination of a diode and a resistor as hereinbefore described. This network 28 allows the signal to rise quickly during charging but decay slower during discharging. That is, the extended decay network serves to stretch the unipolar derivative pulses in a direction of the horizontal scanning to a dergee compatible to the bandwidth of the transmission system. Thus the signal shown as graph line 3 is transformed into a signal as shown in graph line 4 which is stretched from left to right.

This signal is then stored in the storage tube 32 and when the same line is scanned in the reverse direction, a similar network as herein described prevents fast decay and therefore the decaying signal is also stretched from right to left producing the signal shown in graph line 5. This signal illustrates the symmetrical stretching of the decay of the image signal derivative in both the right going direction and the left going direction.

In addition, it can be noted that the signals are directed from the camera 10 into the storage tube 32 which serves the purpose of intermittently writing, erasing and reading. The single beam storage tube 32 avoids the possibility of desynchronization between reading and writing. Intermittent reading and writing of the single beam storage tube is accomplished by modulating the control screen by the modulator 38 between three distinct levels, an erasing level, a writing level, and a reading level.

As hereinbefore described, the modulator directs the signal into a demodulator, which combination provides for a high frequency trapezoidal generating signal alternating between reading and writing. The signal from the demodulator is compared by the stretched bipolar derivative signal from the extended decay network 28 by the comparator 48.

If the signal read from the storage tube 32 is greater than the incoming derivative signal, the voltage from the modulator 38 is diminished to an erasing potential by the modulator 38. If the signal read by the storage tube 32 is smaller than the incoming signal from the network 28, the full generator voltage is applied to the control screen 34 of the tube 32, thus increasing the relative positive charge. In this manner, an electronic charge image on the sensitive dielectric surface is read half the time while in the remaining time it is continuously adjusted to equal the value of the unipolar stretched derivative.

The resulting image signals are all transmitted as they are to the image reproducing portion to produce the final narrow band television image.

Therefore, as described, regardless of the direction in which a line is scanned, advanced information is provided to the image reproducing means about the variations that will follow.

In this respect, I have provided a narrow band television which produces an image utilizing a reduced frequency bandwidth. The reduction of the frequency bandwidth will permit two-way television telephone by ultizing existing wires of the telephone system. It can permit home television recording and a host of other uses that are presently limited by the fact that television utilizes high frequency.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a velocity scan system, a scanning apparatus for the translation of images into electronic signals within a predetermined bandwidth of frequencies, comprising means for scanning the image in two directions for the generation of a first signal proportional to the intensity of the portion of the image being scanned, means for generating a real time second signal which is a function of the rate of variation of the first signal, means for storing the second signal while said scanning means scan in a first direction, means for reading the second signal from the storing means while scanning in a direction opposite from the first direction, means for controlling the velocity of scanning in the direction opposite from the first direction by utilizing the second signal from said reading means, and means for adjustment of the stored second signal during every scan.

2. The combination defined by claim 1 in which said means for generating the second signal include means for damping the delay of the real time second signal to a predetermined extent.

3. The combination defined by claim 1 in which said means for adjustment of the stored second signal includes means of comparing the signal output from said reading means, the stored second signal with the real time second signal, means of adjusting the stored signal to the level of the real time second signal upon decreasing the stored second signal and unaltered upon constant or increasing the stored second signal.

4. The combination defined by claim 3 in which said means for reading and adjustment of the stored second signal includes a storage tube means for alternating the accelerating potential of the electron beam of said storage tube between reading and writing potential levels, means for further adjusting the writing potential in accordance with the amount of electronic charge to be added or subtracted from storage, means of separating the signal read during the time of reading potential and means of comparing this signal to the real time second signal.

5. An electronic system for translating images into electronic signals within a predetermined bandwidth of frequencies, comprising means for scanning the image for the generation of a first signal proportional to the intensity of the portions of the image being scanned, means for generating a second signal from the first signal which is a function of the rate of variation of the first signal, means for storing the second signal, means for reading the second signal, means for rescanning over the same area, in an opposite direction and at a velocity of scanning as a function of the second signal, means for utilizing the information obtained from rescanning for reproducing images therefrom.

6. The combination defined by claim 5 in which said means for generating signals within a predetermined bandwidth of frequencies includes means for scanning an image at a predetermined velocity, means for storing and reading data from said scanning pertaining to a retardation of the predetermined scanning velocity and for providing a signal therefrom, means for producing horizontal and vertical sweep signals, said horizontal and vertical sweep signal operably connected to the scanning means and retarded in velocity in relation to the rate of change of intensity of the image scanned, and the retarded horizontal sweep signal operably connected to the reading and storing means to provide an image intensity signal having a predetermined frequency bandwidth.

7. The combination defined by claim 1 in which said means for utilizing the received signals for reproducing images therefrom includes fixed voltage supplies for providing signals for comparing and adjusting the received signals, and a monitor tube having a power supply operably connected to the adjusted signals to reproduce the images therefrom.

8. An electronic system for generating signals within a predetermined bandwidth, comprising means for scanning an image, means for providing horizontal and vertical deflection voltages related to the rate of variation in intensity of the image being scanned, the scanning means providing an image signal proportional to the intensity of the image being scanned, an amplifier for amplifying the image signal, means for rescanning the image in the opposite direction and at a velocity varying as a function of the image signal, including an electronic filter stage means favoring the passage of a signal energy content in frequencies higher than the predetermined bandwidth, wave form storage means for storing said higher frequencies as a retardation signal and means for scanning simultaneously both said image scanning means and said waveform storage means at a rate substantially inverse to the signal read from the waveform storage means.

9. The combination defined by claim 8 including a differentiating network for extracting the pulses from the image of said image scanning means, a rectifier for providing full wave rectification of the differential image signal, and the output of said rectifier being proportional to the rate of change of intensity of the image.

10. An electronic system comprising means for generating signals within a predetermined bandwidth of frequencies including means for scanning an image, means for generating horizontal and vertical deflection voltages which are a function of the image being scanned, the horizontal and vertical deflection voltages operably connected to the scanning means for providing an image signal proportional to the rate of change of intensity of the image being scanned, amplifying means for amplifying said image signal, circuit means to convert said amplified image signal to a unipolar derivative signal for retarding the rate of scanning of the scanning means, a storage tube operably connected to the unipolar derivative signal for storing said signal, a modulator for modulating said storage tube between distinct potential levels for intermittent writing and reading, a demodulator for deriving the signal read from the storage tube, and a comparator for comparing said derived signal to the unipolar derivative signal to determine a signal level with said signal level providing for either reading or erasing information from the storage tube.

11. An electronic system for generating signals within a predetermined bandwidth of frequencies comprising means for scanning an image at a rate substantially inverse to the rate of variation of the picture intensity by slowing down the speed of scanning during time intervals when the picture intensity varies faster than a predetermined rate, wave shaping means for further shaping the signals during the scanning, waveform storage means for recording the shaped signals as retardation signal means for determining the retardation of said scanning means depending on the rate of change of intensity of said scanned image, means for storing signals proportional to said retardation, means for reading the recorded retardation signal, means for re-scanning the image in the opposite direction in accordance with the recorded retardation signal, means for transmitting the retardation signal and the image signals, means for receiving said signals, and means for reproducing the image from the received image intensity signal while the retardation signals provide information as to the position of the image reproducing signal.

12. An electronic system for scanning visual images at variable frequencies comprising means for scanning a picture, means for rescanning the picture in the opposite direction, waveform storage means for deriving signals containing advanced information as to the rate of intensity variation of the scanned picture to regulate the frequency of re-scanning, means for obtaining output signals from said re-scanning, means for transmitting said signals over a predetermined narrow frequency bandwidth, and means to accurately reproduce said transmitted image.

13. A variable speed electronics system for scanning visual images comprising means for varying the velocity of said scanning depending on the rate of change of intensity of said images, image reproducing means, means for pre-scanning an image in the opposite direction than the direction of scanning means for obtaining signals proportional to the rate of image intensity variation whereby the velocity of scanning is varied, derived by the pre-scanning of the image in the opposite direction, with said signals operably connected to said reproducing means, and said reproducing means responding to said signals to reproduce an image.

14. The combination defined by claim 13 in which said image reproducing means includes means for receiving said signals operably connected to said reproducing means, separation networks for separating said signals to provide an image intensity signal, adjustment networks for providing gain control to said separation networks, and a monitor tube and power supply means operably for receiving said image intensity signal to reproduce an image.

References Cited

UNITED STATES PATENTS

| | | | |
|---|---|---|---|
| 2,752,421 | 6/1956 | Ross | 178—6 |
| 2,957,941 | 10/1960 | Covely | 178—6 |
| 2,965,709 | 12/1960 | Cherry | 178—6 |
| 3,215,773 | 11/1965 | Chatten | 178—6.8 |
| 3,229,033 | 1/1966 | Artzt | 178—6 |
| 3,286,026 | 11/1966 | Greutman | 178—6 |

ROBERT L. GRIFFIN, *Primary Examiner.*

JOHN W. CALDWELL, *Examiner.*

J. A. ORSINO, *Assistant Examiner.*